US012764465B2

(12) United States Patent
Zhang et al.

(10) Patent No.: US 12,764,465 B2

(45) Date of Patent: Oct. 13, 2026

(54) SOUND PICKUP CONTROL METHOD, DEVICE, TERMINAL AND READABLE STORAGE MEDIUM

(71) Applicant: AAC Acoustic Technologies (Shanghai) Co., Ltd., Shanghai (CN)

(72) Inventors: Yanxin Zhang, Shanghai (CN); Yulei Zhang, Shanghai (CN); Hongxing Wang, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 129 days.

(21) Appl. No.: 19/006,247

(22) Filed: Dec. 31, 2024

(65) Prior Publication Data

US 2026/0095696 A1 Apr. 2, 2026

Related U.S. Application Data

(63) Continuation of application No. PCT/CN2024/122211, filed on Sep. 29, 2024.

(51) Int. Cl.

*H04R 3/00* (2006.01)

*H04R 1/40* (2006.01)

(52) U.S. Cl.

CPC ............ *H04R 3/005* (2013.01); *H04R 1/406* (2013.01); *H04R 2499/11* (2013.01)

(58) Field of Classification Search

CPC .... H04R 3/005; H04R 5/027; H04R 2430/03; H04S 2400/15; G06F 3/16; G06F 3/165; G06F 3/167

See application file for complete search history.

(56) References Cited

U.S. PATENT DOCUMENTS 4,984,087 A * 1/1991 Fujimura .............. H04R 3/005 348/222.1

* cited by examiner

*Primary Examiner* — Kile O Blair

(74) *Attorney, Agent, or Firm* — Wiersch Law Group

(57) ABSTRACT

Provided is sound pickup control method, device, terminal and readable storage medium. technical solution includes: determining sound pickup control rule according to application attribute of currently running application on terminal, where process allowed to be called by currently running application includes sound recording process; obtaining sound pickup configuration parameters of key operation event according to sound pickup control rule when receiving key operation event input by preset terminal function key; and controlling sound recording process of currently running application to perform, according to sound pickup configuration parameters, sound pickup operation. In present disclosure, terminal is controlled to perform, using sound pickup working parameters, sound pickup operation according to user's operation behavior on function key during application running process, so that sound pickup operation of terminal is optimized according to user's sound recording needs in different application scenarios, which ensures sound pickup effect of terminal in various application scenarios.

9 Claims, 4 Drawing Sheets

SOUND PICKUP CONTROL METHOD, DEVICE, TERMINAL AND READABLE STORAGE MEDIUM

TECHNICAL FIELD

The present disclosure relates to the field of electronic technology and can be applied to a scenario of sound pickup control of a terminal and, in particular, to a sound pickup control method, device, terminal and readable storage medium.

BACKGROUND

With the continuous development of science and technology, the functions of terminals are becoming more and more diversified. The function of sound pickup, as a frequently used function, has been widely used in people's daily work and life. At present, terminals generally perform sound pickup tasks according to default sound pickup configuration parameters, that is, the same sound pickup configuration parameters are used in different application scenarios, which makes it difficult to satisfy the sound pickup effects expected by users in various application scenarios.

It should be noted that the related art described in this section is not necessarily technologies that have been previously envisaged or adopted. Unless otherwise indicated, it should not be assumed that any of the related art described in this section qualifies as prior art merely by virtue of its inclusion in this section. Similarly, unless otherwise indicated, the problems mentioned in this section should not be considered to have been recognized in any prior art.

SUMMARY

The present disclosure provides a sound pickup control method, device, terminal and readable storage medium, intended to solve at least one of the problems in the related art to a certain extent.

In order to solve the above technical problems, a first aspect of the present disclosure provides a sound pickup control method, including: determining a sound pickup control rule according to an application attribute of a currently running application on a terminal, where a process allowed to be called by the currently running application includes a sound recording process; obtaining sound pickup configuration parameters of a key operation event according to the sound pickup control rule when receiving the key operation event input by a preset terminal function key; and controlling the sound recording process of the currently running application to perform, according to the sound pickup configuration parameters, a sound pickup operation.

A second aspect of the present disclosure provides a sound pickup control device, including: a determination module configured to determine a sound pickup control rule according to an application attribute of a currently running application on a terminal, where a process allowed to be called by the currently running application includes a sound recording process; an obtaining module configured to obtain sound pickup configuration parameters of a key operation event according to the sound pickup control rule when receiving the key operation event input by a preset terminal function key; and a control module configured to control the sound recording process of the currently running application to perform, according to the sound pickup configuration parameters, a sound pickup operation.

A third aspect of the present disclosure provides a terminal, including: a memory, and a processor configured to execute a computer program stored in the memory, and implement, when executing the computer program, the sound pickup control method according to the first aspect of the present disclosure.

A fourth aspect of the present disclosure provides a computer-readable storage medium storing a computer program, when the computer program is executed by a processor, steps of the sound pickup control method according to the first aspect of the present disclosure are implemented.

As can be seen from the above, according to the sound pickup control method, device, terminal and readable storage medium according to the present disclosure, determining a sound pickup control rule according to an application attribute of a currently running application on a terminal, where a process allowed to be called by the currently running application includes a sound recording process; obtaining sound pickup configuration parameters of a key operation event according to the sound pickup control rule when receiving the key operation event input by a preset terminal function key; and controlling the sound recording process of the currently running application to perform, according to the sound pickup configuration parameters, a sound pickup operation. Through the technical solution of the present disclosure, the terminal is controlled to perform, using the sound pickup working parameters, the sound pickup operation according to the user's operation behavior on the function key during the application running process, so that the sound pickup operation of the terminal can be optimized according to the user's sound recording needs in different application scenarios, which ensures the sound pickup effect of the terminal in various application scenarios.

It should be understood that the content described in this section is not intended to identify the key or important features of the present disclosure, nor is it intended to limit the scope of the present disclosure. Other features of the present disclosure will become easily understood through the following description.

BRIEF DESCRIPTION OF DRAWINGS

The drawings exemplarily illustrate the embodiments and constitute a part of the specification, and together with the literal description of the specification, are used to explain the exemplary implementation of the embodiments. The drawings shown are for illustrative purposes only and do not limit the scope of the claims. In all drawings, the same reference signs refer to similar but not necessarily identical elements.

DESCRIPTION OF EMBODIMENTS

In order to make the purpose, features and advantages of the present disclosure clear and easy to understand, the technical solutions of the embodiments of the present disclosure will be clearly and completely described below in conjunction with the drawings of the present disclosure. The described embodiments are only some embodiments of the present disclosure, rather than all embodiments. According to the embodiments of the present disclosure, all other embodiments obtained by those skilled in the art without creative efforts shall fall within the protection scope of the present disclosure.

In the description of the embodiments of the present disclosure, the terms “first” and “second” are only used for descriptive purposes and cannot be understood as indicating or implying relative importance or implicitly indicating the number of the indicated technical features. Therefore, the features defined with “first” and “second” can explicitly or implicitly include one or more of the features. The term “multiple” means two or more, unless otherwise expressly specified. The term “include” indicates the presence of the described features, entireties, steps, operations, elements and/or assemblies, but does not exclude the presence or addition of one or more other features, entireties, steps, operations, elements, assemblies and/or their combinations. The term “and/or” is used to describe the association relationship of associated objects, indicating that there can be three relationships. For example, A and/or B can include the following three situations: A exists alone, A and B exist simultaneously, and B exists alone. The character “/” generally indicates that the associated objects before and after are in a relationship “or”.

Figure 1:
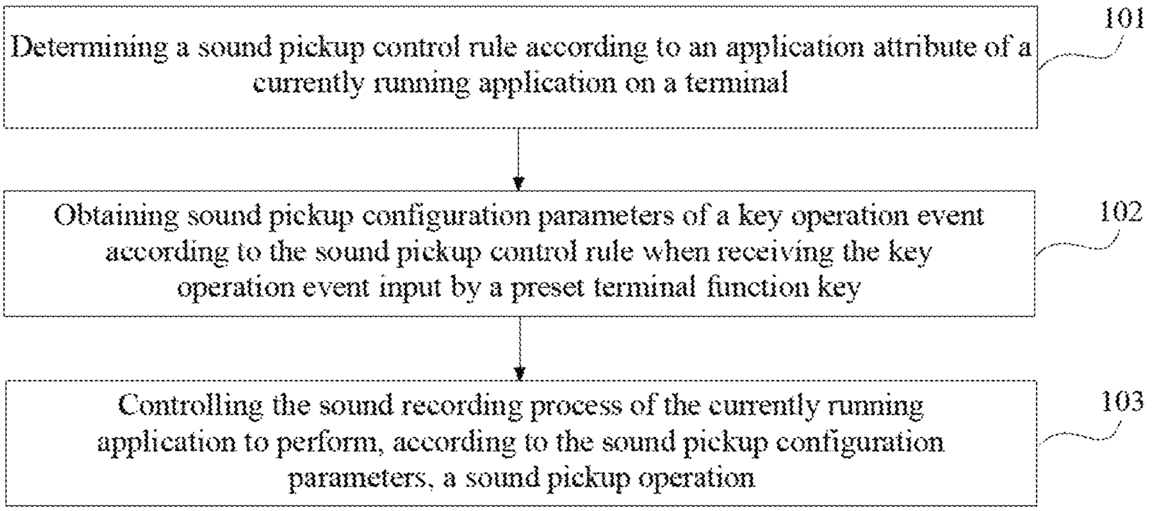
FIG. 1 is a schematic diagram of a basic process of a sound pickup control method according to an embodiment of the present disclosure.

In order to solve the problem that the related art cannot simultaneously meet the sound pickup effect expected by users in various application scenarios, an embodiment of the present disclosure provides a sound pickup control method, which can be applied to a terminal with a sound pickup, and the sound pickup includes a microphone and an audio signal processing circuit (such as an audio signal amplification circuit). FIG. 1 is a basic flow chart of the sound pickup control method according to the embodiment, and the sound pickup control method includes the following steps.

Step 101, a sound pickup control rule is determined according to an application attribute of a currently running application on a terminal.

In an embodiment, a process allowed to be called by the currently running application includes a sound recording process, and the application attribute can include at least one of an application type and a function type currently used in the application. It should be understood that the “process” refers to an instance of the running application. Each application can have one or more processes that are allowed to be called. The process can perform various tasks, including but not limited to processing user input, performing calculations or data acquisition, communicating with other applications, etc.

It should be noted that in an embodiment, the application type can include a camera application, a sound recording application, etc. The function type of the camera application can include video recording function and photo taking function. The photo taking function further includes static image taking function and dynamic image taking function. Although the sound recording process can be started in different application running scenarios, the user’s sound recording needs in different application running scenarios are different. Based on the above, in the embodiment, specific sound pickup control rules are configured for different application attributes, respectively. The sound pickup control rule includes a customized mapping relationship between the key operation events and the sound pickup configuration parameters. In actual applications, the key operation events and/or the sound pickup configuration parameters recorded in different sound pickup control rules are different.

Step 102, the sound pickup configuration parameters of the key operation event are obtained according to the sound pickup control rule when the key operation event input by a preset terminal function key is received.

In an embodiment, the terminal function key can be a physical key or a virtual key, the setting position of the terminal function key can be a specific side or back of the terminal, and the terminal function key can be a single-body key or a split key. In additional, the terminal function key can be a multi-function key, for example, the key can be used as a human-computer interaction interface for the camera application and the sound recording application simultaneously. It should be noted that the terminal function key can reuse traditionally designed keys (such as the volume adjustment key) or can be the key with a separate improved design. In actual applications, if a traditional key needs to be reused, it can be determined whether reuse conditions of the traditional key are met according to the application attribute of the currently running application. If so, the function state of the traditional key is switched to a sound pickup control state to respond to the key operation event described above in the embodiment.

In an embodiment, the terminal function key is a virtual side key configured on a side of the terminal, which can realize multi-gesture interaction and multi-scenario customized applications, set specific interaction methods for specific application scenarios, and assist the user to realize one-handed interaction and blind operation.

In some embodiments, the above step of obtaining the sound pickup configuration parameters of the key operation event according to the sound pickup control rule includes: obtaining a sound pickup space range corresponding to the key operation event according to the sound pickup control rule. The sound pickup configuration parameters include the sound pickup space range.

In an embodiment, the sound pickup space range refers to the size of the space where sound needs to be collected. The sound pickup space range is related to the width of a sound pickup beam of the microphone, and the two are positively correlated. In the embodiment, compared with a fixed sound pickup space range, adjusting the sound pickup space range accordingly through the key operation can flexibly meet the sound pickup needs in different scenarios.

In some embodiments, the key operation event includes a continuous operation parameter corresponding to the terminal function key, the continuous operation parameter includes at least one of a continuous sliding displacement and a continuous pressing duration, and the continuous operation parameter is in a preset functional relationship with the sound pickup space range.

It should be noted that in the embodiments, the functional relationship can be a direct proportion functional relationship. In actual applications, when performing the sound pickup control operation, the user can apply a sliding operation and a continuous pressing operation to the terminal function key. It can be understood that when the user applies the sliding operation to the terminal function key, the sliding displacement detected by the terminal includes a sliding distance and a sliding direction.

The embodiments take the continuous sliding displacement as an example to illustrate a typical sound pickup control process. In the embodiments, the virtual side key is provided on the terminal. When the user applies a sliding operation on the virtual side key, the terminal can detect a sliding distance with a sliding direction. Whether the sound pickup space range is reduced or enlarged can be determined according to the sliding direction, and the specific scale ratio of the sound pickup space range can be determined according to the sliding distance. The sound pickup control can also be performed by the continuous pressing operation, i.e., a press-hold operation. For example, the virtual side key of the terminal includes an upper function area and a lower function area, the user can apply the continuous pressing operation to one of the function areas according to the needs, an identity of the operated function area determines whether the sound pickup space range is reduced or enlarged, and the duration of continuous pressing can determine the specific scale ratio of the sound pickup space range.

In actual applications, the key operation event can further include a single press operation event. For example, before performing the step of determining the sound pickup control rule according to the application attribute of the currently running application on the terminal, the method further includes: detecting whether the key operation event is a single press operation event; if so, triggering the sound recording process to start the sound pickup operation. If the currently running application is the camera application, while controlling the imaging process to start the imaging operation, the sound recording process is synchronously triggered to start the sound pickup operation.

In some embodiments, the method further includes: locating, within an effective sound pickup space of the terminal, a location of a target sound source; determining a sound pickup reference location referenced by the sound pickup space range according to the location of the target sound source; where the sound pickup configuration parameters further include the sound pickup reference location.

In actual application scenarios, there is usually background noise and interference within the effective sound pickup space of the terminal. If the sound pickup operation is performed in a fixed direction (for example, perpendicular to the direction of the microphone), noise and interference sounds will inevitably be recorded, and thus the clarity of the sound cannot be guaranteed. Based on the above, in the embodiments, the location of the target sound source is located in the effective sound pickup space of the terminal, and the sound pickup reference location of the microphone array is determined according to the location of the target sound source, thus the aforementioned sound pickup space range should be limited with reference to the sound pickup reference location. In the embodiments, according to the directional sound pickup solution, only the sound in a specific location can be collected and the noise and interference sound in non-target locations can be suppressed, thereby effectively ensuring the clarity of the sound pickup.

It should be noted that in the embodiments, the location of the target sound source can be obtained through a sound source localization algorithm, the key target such as people and vehicles in the actual application scenarios can be identified through an image recognition algorithm, and the location of the key target is used as the location of the target sound source.

In some embodiments, a type of the currently running application includes a camera application, and the method further includes: obtaining an imaging scale multiple according to the key operation event; and controlling an imaging process of the currently running application to perform, according to the imaging scale multiple, an imaging operation.

In actual applications, the terminal function key can be reused by the shooting control function and the sound pickup control function, that is, the key operation event input by the user for the terminal function key can synchronously control the shooting and sound pickup, thereby achieving synchronous changes in sound with image scaling. Taking the case where the key operation event is the sliding operation event as an example, when the terminal detects the sliding operation applied by the user to the terminal function key, the camera focal length and the sound pickup space range are synchronously scaled. For example, when the camera focal length is controlled to be increased by sliding the key upward (i.e. the imaging picture is zoomed out), the sound pickup space range is controlled to be wider, and when the camera focal length is controlled to be decreased by sliding the key downward (i.e. the imaging picture is zoomed in), the sound pickup space range is controlled to be narrower.

In some embodiments, the type of the currently running application includes the camera application, and the method further includes: determining whether the key operation event satisfies a preset directional sound pickup triggering event, where if the preset directional sound pickup triggering event is satisfied, a step of locating, within the effective sound pickup space of the terminal, the location of the target sound source is performed; and if not, the sound pickup space range is a complete sound pickup space range in a camera framing direction.

It should be noted that in the embodiments, whether the directional sound pickup control needs to be triggered can be determined according to the actual application scenarios. For the sound recording application, the directional sound pickup is required in any case, and for the camera application, the step of locating, within the effective sound pickup space of the terminal, the location of the target sound source is triggered only when the key operation event satisfies the specific event for triggering directional sound pickup. When the specific event for triggering directional sound pickup is not satisfied, the sound pickup space range of the microphone array is the complete space defined by a 180° plane perpendicular to the camera framing direction.

It should be noted that in the embodiments, the scale multiple of the camera focal length can be determined according to the key operation event, and whether a trigger condition for directional sound pickup is satisfied can be determined according to the scale multiple of the camera focal length. If the scale multiple of the camera focal length is less than or equal to 1, it is determined that the trigger condition for directional sound pickup is not satisfied.

In some embodiments, the method further includes: executing a sound enhancement algorithm with reference to the continuous operation parameter during an execution of the sound pickup operation if the sound pickup space range reaches a range threshold indicated by a constraint condition of the preset functional relationship, where the sound enhancement algorithm includes at least one of a sound signal amplification algorithm, a sound signal noise reduction algorithm, and a sound source separation algorithm.

It should be noted that in the embodiments, the functional relationship between the continuous operation parameter and the sound pickup space range has a corresponding constraint condition, which are used to constrain the applicable scope of the functional relationship. In some embodiments, the constraint condition is that the sound pickup space range is less than or equal to a threshold of the preset range, and the sound pickup space range, corresponding to the continuous operation parameter, calculated by the function relationship is limited to the range threshold. Correspondingly, the continuous operation parameter also has a specific parameter threshold. When the continuous operation parameter reaches the parameter threshold, the sound pickup space range calculated by the functional relationship reaches the range threshold. In the embodiments, even if the continuous operation parameter obtained in real time exceeds the specific parameter threshold, the function calculation result still takes the range threshold of the sound pickup space range. For example, when the scale ratio of the sound pickup space range is 4 times, the range threshold is reached, and the width of the collection beam of the microphone array reaches the limit width. Even if the continuous operation parameter input by the user can theoretically calculate the sound pickup space range exceeding the range threshold according to the function relationship without constraint conditions, the sound pickup space range corresponding to the continuous operation parameter is still determined as the range threshold.

In actual applications, in the embodiments, if the sound pickup space range reaches the range threshold, the sound enhancement algorithm can be further executed in response to the continuous operation parameter. Taking the camera application as an example, when the imaging scale multiple indicated by the continuous operation parameter reaches a preset multiple (for example, the aforementioned 4 times), the sound pickup space range required referenced by the pickup control is set as the range threshold. As the imaging scale multiple increases, the sound signal amplification algorithm can be triggered to amplify the size of the input signal of the sound collected by the microphone array. Other uplink processing algorithms can also be triggered, such as triggering the sound source separation algorithm first, and then triggering the sound signal noise reduction algorithm, in such a manner to improve the clarity and loudness of the collected sound.

In the embodiments, the sound enhancement algorithm can be flexibly selected. When there are multiple sound enhancement algorithms, a specific type of sound enhancement algorithm can be triggered by referring to the continuous operation parameter. All types of sound enhancement algorithms can also be triggered, but when the algorithms are executed, the execution parameters of the algorithms (such as sound signal amplification, noise reduction ratio) are configured by referring to the continuous operation parameter, which are not limited thereto in the present disclosure.

Step 103, the sound recording process of the currently running application is controlled to perform, according to the sound pickup configuration parameters, a sound pickup operation.

In some embodiments, after the sound pickup configuration parameters are determined, the sound recording process started by the camera application or the sound recording application controls the sound pickup to perform the corresponding sound pickup operation according to the sound pickup configuration parameters. On the one hand, the real-time sound recording preference of the user can be sensed in response to the key operation of the user, and the sound pickup behavior of the terminal is adjusted accordingly, which can achieve directional sound pickup and specific-range sound pickup that are adapted to the actual scenarios, thereby improving the sound pickup effect. On the other hand, the application type of the currently running application is not limited to the sound recording application, but can also be the camera application. Thus, according to the key operation of the user, the synchronous adjustment of audio and video acquisition behaviors can be achieved, which greatly improves the convenience of operation.

It should be noted that the sound pickup operation is generally the continuous operation, and in actual application scenarios, the operation is generally terminated in response to user instructions. In some embodiments, the above terminal function key can also be used as a control to terminate the pickup operation. For example, it is detected whether the key operation event is the single press operation event, if so, the sound pickup operation of the sound recording process is terminated. If the currently running application is the camera application, the sound pickup operation of the sound recording process is terminated while the imaging process is controlled to end the imaging operation.

Figure 2:
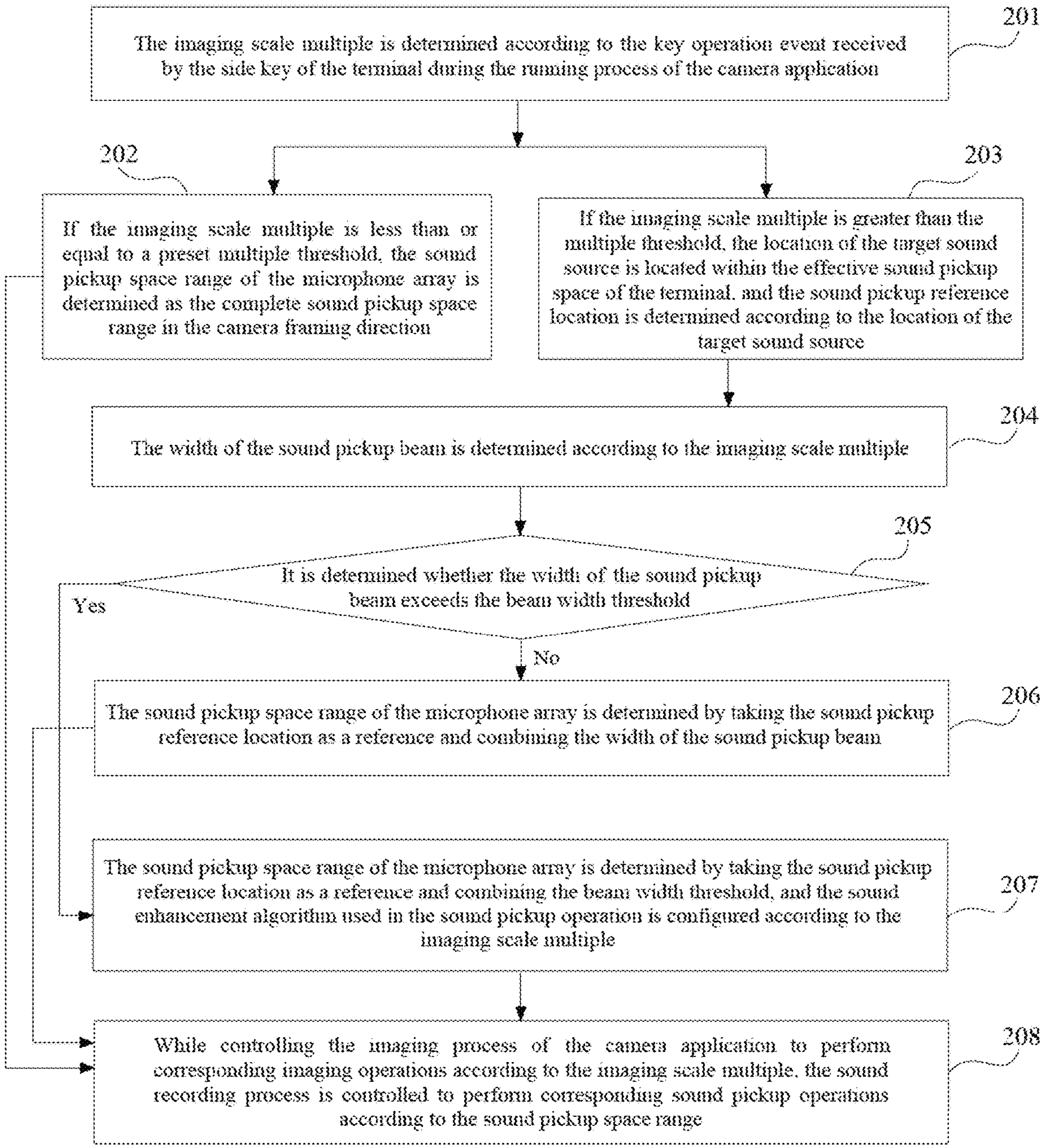
FIG. 2 is a schematic diagram of a detained process of a sound pickup control method according to an embodiment of the present disclosure.

In order to better illustrate the embodiments of the present disclosure, an embodiment of the present disclosure provides a detailed sound pickup control method. FIG. 2 is a schematic diagram of a detained process of a sound pickup control method according to an embodiment of the present disclosure, and the sound pickup control method includes the following steps.

Step 201, the imaging scale multiple is determined according to the key operation event received by the side key of the terminal during the running process of the camera application.

Step 202, if the imaging scale multiple is less than or equal to a preset multiple threshold, the sound pickup space range of the microphone array is determined as the complete sound pickup space range in the camera framing direction, and then step 208 is executed.

Step 203, if the imaging scale multiple is greater than the multiple threshold, the location of the target sound source is located within the effective sound pickup space of the terminal, and the sound pickup reference location is determined according to the location of the target sound source.

Step 204, the width of the sound pickup beam is determined according to the imaging scale multiple.

Step 205, it is determined whether the width of the sound pickup beam exceeds the beam width threshold; if not, step 206 is executed; if yes, step 207 is executed.

Step 206, the sound pickup space range of the microphone array is determined by taking the sound pickup reference location as a reference and combining the width of the sound pickup beam, and then step 208 is executed.

Step 207, the sound pickup space range of the microphone array is determined by taking the sound pickup reference location as a reference and combining the beam width threshold, and the sound enhancement algorithm used in the sound pickup operation is configured according to the imaging scale multiple.

Step 208, while controlling the imaging process of the camera application to perform corresponding imaging operations according to the imaging scale multiple, the sound recording process is controlled to perform corresponding sound pickup operations according to the sound pickup space range.

It should be understood that in the embodiments, the size of the sequence number of each step does not mean the order of execution of the steps. The order of execution of each step should be determined by its function and internal logic, and should not constitute a unique limitation on the implementation of the embodiments of the present disclosure.

Figure 3:
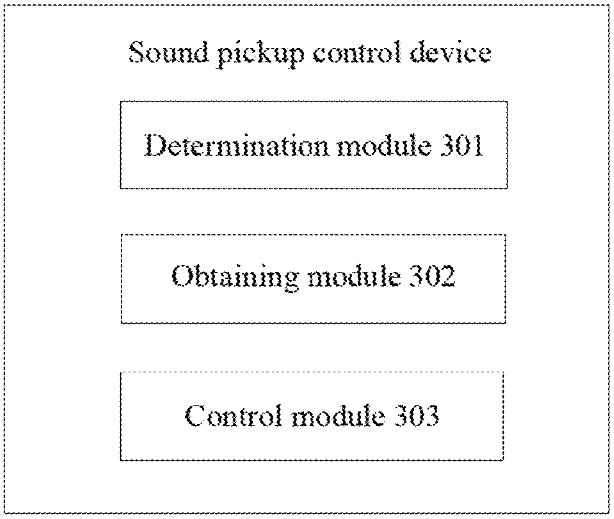
FIG. 3 is a schematic diagram of functional modules of a sound pickup control device according to an embodiment of the present disclosure.

FIG. 3 is a sound pickup control device according to an embodiment of the present disclosure. The sound pickup control device can be used to implement the sound pickup control method in the above embodiments, mainly including: a determination module 301, an obtaining module 302 and a control module 303. The determination module 301 is configured to determine a sound pickup control rule according to an application attribute of a currently running application on a terminal. A process allowed to be called by the currently running application includes a sound recording process. The obtaining module 302 is configured to obtain sound pickup configuration parameters of a key operation event according to the sound pickup control rule when receiving the key operation event input by a preset terminal function key. The control module 303 is configured to control the sound recording process of the currently running application to perform, according to the sound pickup configuration parameters, a sound pickup operation.

In an embodiment, the sound pickup control device further includes an execution module. The execution module is configured to execute a sound enhancement algorithm with reference to the continuous operation parameter during the execution of the sound pickup operation if the sound pickup space range reaches the range threshold indicated by the constraint condition corresponding to the functional relationship. The sound enhancement algorithm includes at least one of the sound signal amplification algorithm, the sound signal noise reduction algorithm, and the sound source separation algorithm.

It should be noted that the sound pickup control method according to the above embodiments can all be implemented based on the sound pickup control device according to the embodiment. Those skilled in the art can clearly understand that, for the convenience and simplicity of description, the specific working process of the sound pickup control device described in the embodiment can be implemented by referring to the corresponding working process in the above embodiments, which will not be elaborated in the present disclosure.

According to the technical solutions of the above embodiments of the present disclosure, determining a sound pickup control rule according to an application attribute of a currently running application on a terminal, where a process allowed to be called by the currently running application includes a sound recording process; obtaining sound pickup configuration parameters of a key operation event according to the sound pickup control rule when receiving the key operation event input by a preset terminal function key; and controlling the sound recording process of the currently running application to perform, according to the sound pickup configuration parameters, a sound pickup operation. Through the technical solution of the present disclosure, the terminal is controlled to perform, using the sound pickup working parameters, the sound pickup operation according to the user's operation behavior on the function key during the application running process, so that the sound pickup operation of the terminal can be optimized according to the user's sound recording needs in different application scenarios, which ensures the sound pickup effect of the terminal in various application scenarios.

Figure 4:
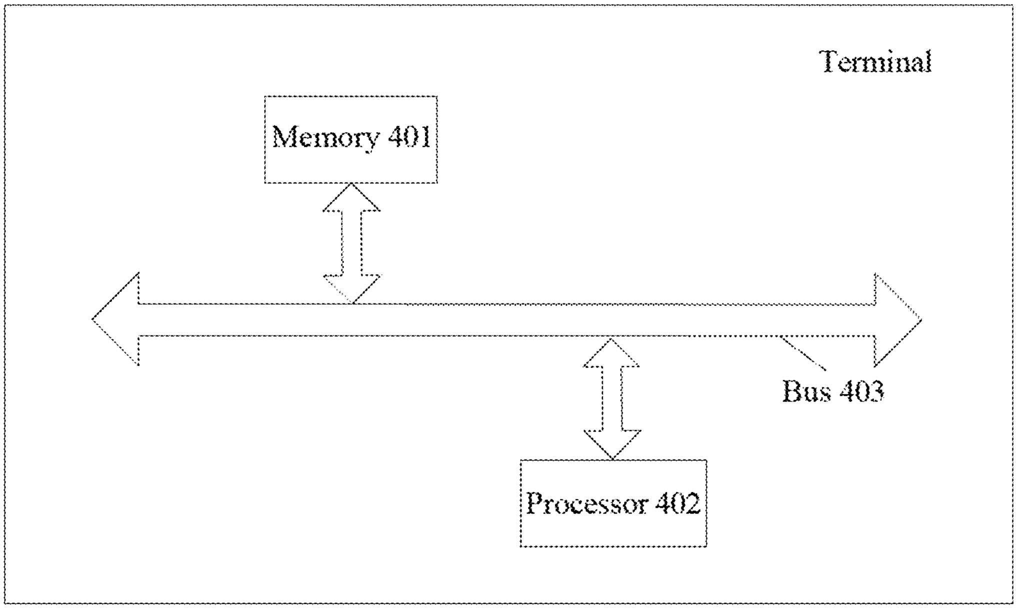
FIG. 4 is a schematic diagram of a hardware structure of a terminal according to an embodiment of the present disclosure.

Referring to FIG. 4, FIG. 4 is a terminal according to an embodiment of the present disclosure. The terminal can be used to implement the sound pickup control method according to the above embodiments. As shown in FIG. 4, the terminal mainly includes: a memory 401, a processor 402, and bus 403. The memory 401 and the processor 402 are connected via the bus 403. The memory 401 stores a computer program that can be run on the processor 402. When the processor 402 executes the computer program, the sound pickup control method according to the above embodiments is implemented. The number of processors can be one or more.

The memory 401 can be a high-speed random access memory (RAM) memory, or a non-volatile memory, such as a disk memory. The memory 401 is configured to store executable program codes, and the processor 402 is coupled to the memory 401.

The present disclosure further provides a computer-readable storage medium, which can be provided in the terminal according to the above embodiments. The computer-readable storage medium can be the memory according to the embodiment shown in FIG. 4.

The computer-readable storage medium stores a computer program, and when the program is executed by the processor, the sound pickup control method according to the above embodiments is implemented. The computer storable medium can also be a U disk, a mobile hard disk, a read-only memory (ROM), a RAM, a magnetic disk or an optical disk, or other medium that can store program codes.

In some embodiments of the present disclosure, it should be understood that the disclosed device and methods can be implemented in other ways. For example, the device embodiments described above are merely illustrative, and the division of the modules is merely a logical function division. In actual implementation, there may be other division methods. Multiple modules or assemblies can be combined or integrated into another system. Some features can be ignored or not performed. Another point is that the mutual coupling or direct coupling or communication connection shown or discussed can be an indirect coupling or communication connection through some interfaces, devices or modules, which can be electrical, mechanical or other forms.

The modules described as separate components may or may not be physically separated, and the components displayed as modules may or may not be physical modules, that is, may be located in one place or may be distributed over multiple network modules. Some or all of the modules can be selected according to actual needs to achieve the purpose of the embodiments.

In the embodiments of the present disclosure, each functional module can be integrated into one processing module, or each module can exist physically separately, or two or more modules can be integrated into one module. The above integrated module can be implemented in the form of hardware or in the form of software functional module.

If the integrated module is implemented in the form of the software function module and sold or used as an independent product, it can be stored in a computer-readable storage medium. Based on this understanding, the essence of the technical solution of the present disclosure, or the part of the technical solution that contributes to the prior art, or all or part of the technical solution can be embodied in the form of a software product. The computer software product is stored in a readable storage medium, and includes a number of instructions for enabling a computer device (which can be a personal computer, a server, or a network device, etc.) to execute all or part of the steps of the methods according to the embodiments of the present disclosure. The above readable storage medium includes various medium that can store program codes, such as a USB flash drive, a mobile hard disk, a ROM, a RAM, a magnetic disk or an optical disk.

It should be noted that, for the convenience of description, the above method embodiments are all described as a series of action combinations. However, those skilled in the art should appreciate that the present disclosure is not limited by the described order of actions, because according to the present disclosure, certain steps can be performed in other orders or simultaneously. Those skilled in the art should also appreciate that the embodiments described in the specification are all preferred embodiments, and the actions and modules involved are not necessarily required by the present disclosure.

In the above embodiments, the description of each embodiment has its own emphasis. For parts not described in detail in a certain embodiment, please refer to the relevant description in other embodiments.

The above is a description of the sound pickup control method, device, terminal and readable storage medium according to the present disclosure. For those skilled in the art, there will be changes in the specific implementation and application scopes according to the ideas of the embodiments of the present disclosure. In summary, the contents of the specification should not be understood as limiting the present disclosure.

What is claimed is:

1. A sound pickup control method, comprising:

determining a sound pickup control rule according to an application attribute of a currently running application on a terminal, wherein a process allowed to be called by the currently running application comprises a sound recording process;

obtaining a sound pickup configuration parameter corresponding to a key operation event according to the sound pickup control rule when receiving the key operation event input by a preset terminal function key; and controlling the sound recording process of the currently running application to perform, according to the sound pickup configuration parameter, a corresponding sound pickup operation.

2. The sound pickup control method as described in claim 1, wherein the obtaining sound pickup configuration parameter of the key operation event according to the sound pickup control rule comprises:

obtaining a sound pickup space range corresponding to the key operation event according to the sound pickup control rule;

wherein the sound pickup configuration parameter comprise the sound pickup space range.

3. The sound pickup control method as described in claim 2, further comprising:

locating, within an effective sound pickup space of the terminal, a location of a target sound source; and determining a sound pickup reference location referenced by the sound pickup space range according to the location of the target sound source;

wherein the sound pickup configuration parameter further comprise the sound pickup reference location.

4. The sound pickup control method as described in claim 2, wherein the key operation event comprises a continuous operation parameter corresponding to the terminal function key, wherein the continuous operation parameter comprises at least one of a continuous sliding displacement or a continuous pressing duration, and the continuous operation parameter is in a preset functional relationship with the sound pickup space range.

5. The sound pickup control method as described in claim 4, further comprising:

executing a sound enhancement algorithm with reference to the continuous operation parameter during execution of the sound pickup operation if the sound pickup space range reaches a range threshold indicated by a constraint condition of the functional relationship, wherein the sound enhancement algorithm comprises at least one of a sound signal amplification algorithm, a sound signal noise reduction algorithm, and a sound source separation algorithm.

6. The sound pickup control method as described in claim 3, wherein the currently running application comprises a camera application;

the method further comprises:

determining whether the key operation event satisfies a preset directional sound pickup triggering event;

wherein in responsive to the preset directional sound pickup triggering event being satisfied, the locating, within the effective sound pickup space of the terminal, the location of the target sound source is performed; and in responsive to the preset directional sound pickup triggering event not being satisfied, the sound pickup space range is a complete sound pickup space range in a camera framing direction.

7. The sound pickup control method as described in claim 1, wherein the currently running application comprises a camera application, the method further comprises:

obtaining an imaging scale multiple according to the key operation event; and controlling an imaging process of the currently running application to perform, according to the imaging scale multiple, an imaging operation.

8. A terminal, comprising:

a memory, and a processor configured to execute a computer program stored in the memory, and implement, when executing the computer program, the sound pickup control method as described in claim 1.

9. A sound pickup control device, comprising:

a determination module configured to determine a sound pickup control rule according to an application attribute of a currently running application on a terminal, wherein a process allowed to be called by the currently running application comprises a sound recording process;

an obtaining module configured to obtain sound pickup configuration parameter corresponding to a key operation event according to the sound pickup control rule when receiving the key operation event input by a preset terminal function key; and a control module configured to control the sound recording process of the currently running application to perform, according to the sound pickup configuration parameter, a corresponding sound pickup operation.

* * * * *